Sept. 22, 1959    W. A. BRADY, JR    2,905,803
NUT LOADING AND WELDING MACHINE
Filed Jan. 13, 1958    2 Sheets-Sheet 1

INVENTOR.
William Q. Brady, Jr.
BY
L. D. Burch
ATTORNEY.

Sept. 22, 1959 W. A. BRADY, JR 2,905,803
NUT LOADING AND WELDING MACHINE
Filed Jan. 13, 1958 2 Sheets-Sheet 2
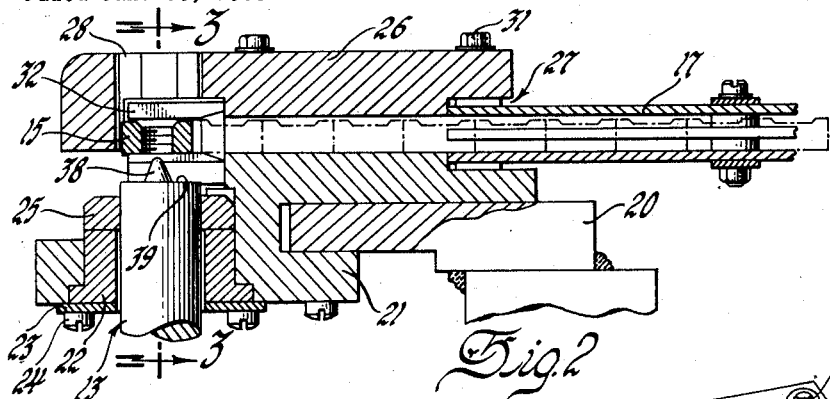
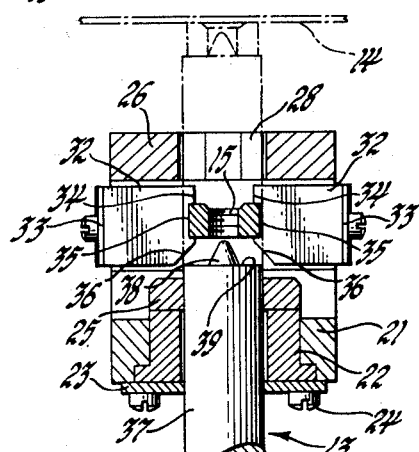
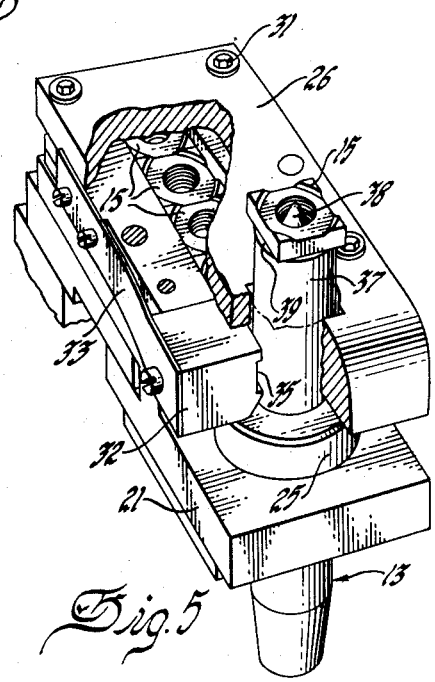
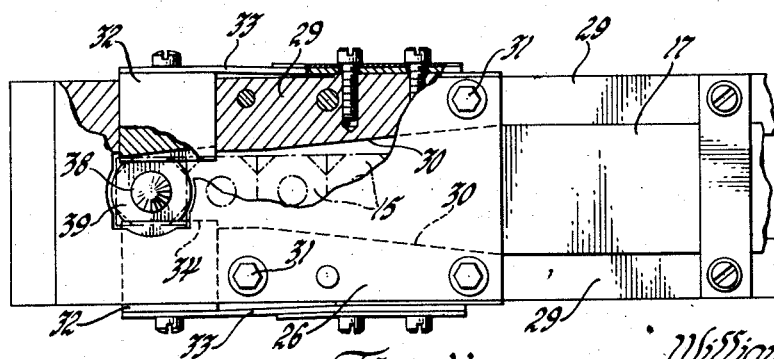
INVENTOR.
William A. Brady, Jr.
BY
L. D. Burch
ATTORNEY

2,905,803

NUT LOADING AND WELDING MACHINE

William A. Brady, Jr., Warren, Mich., assignor to General Motors Corporation, Detroit, Mich., a corporation of Delaware Application January 13, 1958, Serial No. 708,424

8 Claims. (Cl. 219—79)

This invention relates to an apparatus for positioning articles to be attached to a supporting body and more particularly to a machine for locating weld nuts to be attached to a metal sheet.

Certain types of fasteners, such as weld nuts, are frequently attached to sheet metal members by projection welding. In the past such nuts have been placed in position manually before the actual welding operation requiring one operator to maneuver both the sheet metal member and the weld nuts when a relatively small piece of sheet metal was being welded, and two or more operators to handle both objects when a larger piece of sheet metal was being worked. Labor costs, therefore, constitute a large portion of the expense involved in locating and welding nuts to a metal sheet and in many cases manually locating weld nuts is difficult and unsafe.

The device in which this invention is embodied comprises a projection welding machine, an escapement mechanism which locates one nut at a time in the proper position for welding to a metal sheet, and a hopper to automatically feed the weld nuts to the escapement assembly. This device eliminates the manual location of weld nuts leaving one operator free to maneuver only the metal sheet, or eliminating one operator altogether when two have been required, resulting in more efficient operation, decreased costs in this type of welding, and safer operation of a machine.

In the drawings:

Figure 2 is an elevational view in section of the escapement assembly of the machine shown in Figure 1.

Figure 3 is a cross-sectional view substantially along the line 3—3 of Figure 2.

Figure 4 is a top plan view partly in section of the escapement assembly of Figure 2.

Figure 5 is an isometric view of the escapement assembly of Figure 2 with portions broken away to show the interior of the mechanism.

Figure 1:
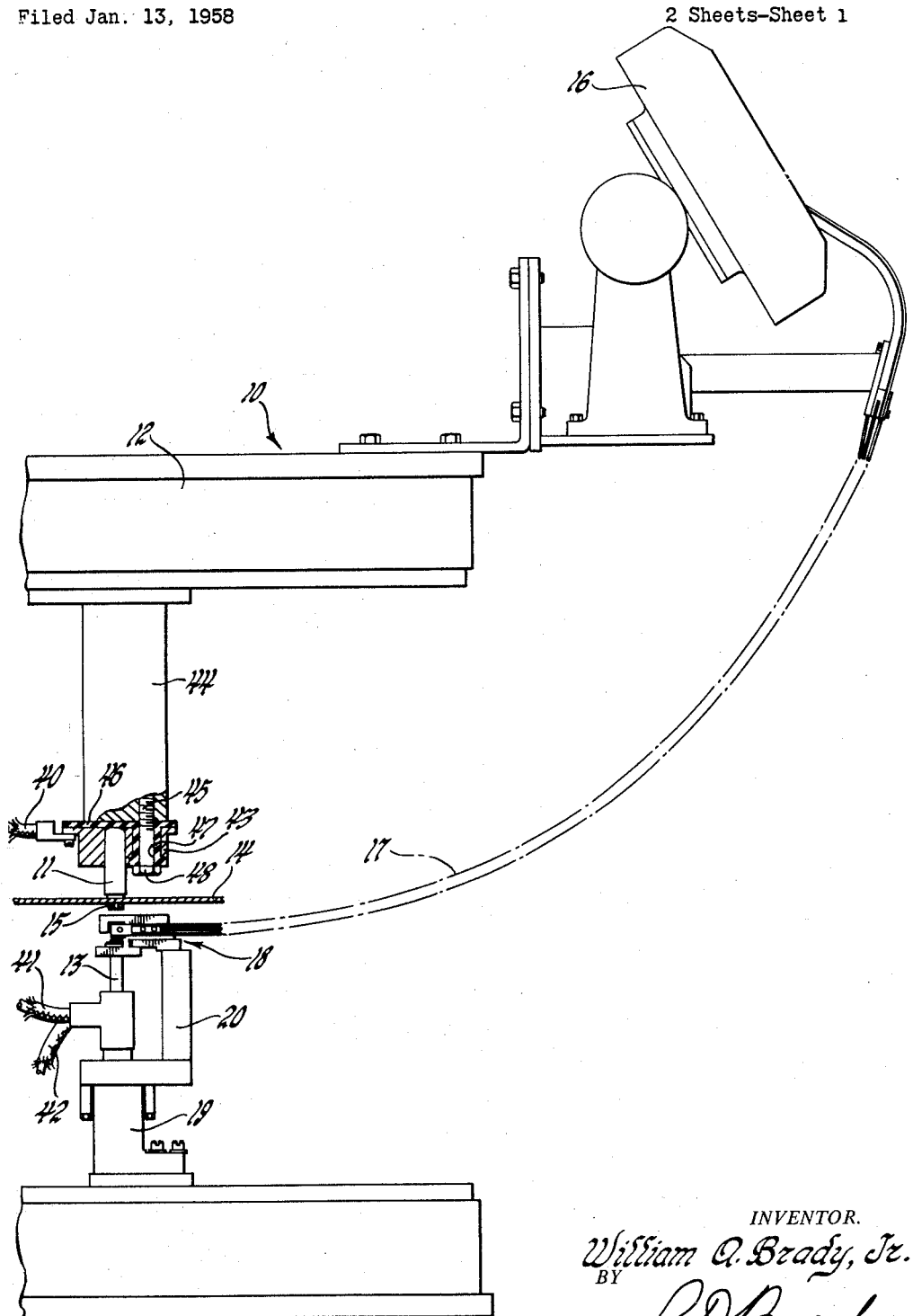
Figure 1 is a partial elevation view of the machine embodying the invention.

Referring more particularly to the drawings, Figure 1 shows a welding machine indicated generally by the numeral 10 which has a stationary welding electrode 11 depending from the main frame 12 of the welding machine 10. A reciprocable electrode 13 extends upwardly from the main frame and is oppositely disposed and co-axial with the stationary electrode 11. A piece of sheet metal 14 to which the weld nuts 15 are to be attached is suitably positioned by the operator between the electrodes. A hopper 16, of any well known type, is also attached to the main frame 12 and has extending from it, generally downwardly, a flexible feed chute or track 17 which conveys weld nuts to the escapement assembly indicated by the numeral 18.

The escapement assembly, shown in more detail in Figures 2 through 5, consists of a supporting bracket 20 which is attached to the reciprocating and mounting mechanism 19 of the reciprocable electrode. A bushing block 21 is slidably secured to the supporting bracket 20 to allow for a certain amount of lateral movement of the escapement assembly and ensure proper alignment of the escapement assembly with the reciprocable electrode. A bushing 22, secured in the bushing block by a plate 23 and machine screws 24, receives the reciprocable electrode 13 to properly position the slidable escapement mechanism for passage therethrough by the electrode. A cap portion 25 on the bushing provides a tight fit around the reciprocable electrode to remove any flash that may be retained on the electrode after the welding operation. An upper guide block 26 is vertically spaced from the bushing block to allow for the passage of weld nuts between the two blocks, the weld nuts being fed to the passage from the lower end of the track 17 extending into the bushing block and upper guide block as at 27. The upper guide block has a hole 28 through which the reciprocable electrode passes when it is moving up to the welding position. The separation between the upper guide block and the bushing block is maintained by a pair of spacer blocks 29, as seen in Figure 4, which are also spaced to allow passage of weld nuts therebetween. The slanted surfaces 30 ensure the proper positioning of the weld nuts as they pass between the spacer blocks. Thus, a passage defined by the spacer blocks and the bushing block and upper guide block provides a track through which the weld nuts pass and which maintains the weld nuts in a proper position with respect to the escapement mechanism. The upper guide block, spacer blocks and bushing block assembly is held together by a number of machine screws 31. A pair of jaws 32 are resiliently mounted on the spacer blocks, as by leaf springs 33, and are located between the vertically spaced blocks and on either side of the reciprocable electrode. The inside faces 34 of the jaws are provided with grooves 35 which receive the weld nuts 15 from the passage between the spaced blocks. The leaf springs 33 bias the jaws to securely hold the weld nut when the jaws are retaining the weld nut for engagement by the reciprocable electrode. Cam surfaces 36 are provided in the bottom portion of the jaws and are acted upon by the reciprocable electrode in its upward travel.

The reciprocable electrode has a body portion 37 and a pilot portion 38 which is receivable in the central hole of the weld nut 15. The jaws 32 retain the weld nut above and co-axial with the pilot portion 38 on the reciprocable electrode such that as the electrode moves up the pilot portion will enter the central hole in the weld nut and center the weld nut on the shoulder 39 of the electrode as it is carried to the metal sheet. The electrode shoulder 39 engages the cam surfaces on the jaws and, as the pilot portion of the electrode enters the central hole in the weld nut, the jaws will be spread apart freeing the weld nut.

The operation of the welding machine and escapement mechanism is as follows: A metal sheet is placed between the electrodes by the operator in the proper position for having the nuts welded thereon. A weld nut is held in position over the reciprocable electrode by the jaws and the reciprocable electrode starts to move up to the welding position. The pilot portion 38 engages the hole through the center of the weld nut 15 and the shoulder 39 acts against the cam surfaces 36 on the jaws 32. The jaws are thus spread apart allowing the electrode to freely carry the nut up through the upper guide block and to the metal sheet above to be welded, in the position shown in phantom in Figure 3. At the completion of the welding operation the reciprocable electrode moves back down through the upper guide block and from between the jaws. The leaf springs 33 bias the jaws into nut receiving position and another nut is gravity fed through the passage in the spaced blocks, and into the grooves 35 in the jaws. The electrode continues down through the bushing cap and bushing to strike off any flash retained from the welding operation. This cycle is repeated as many times as is necessary to properly supply the metal sheet with weld nuts.

The electrical circuit for the welding machine differs from the conventional welding machine in that the power is supplied to the upper electrode rather than the lower electrode. Cables 40 and 41, in Figure 1, carry the necessary potential to the machine from a transformer, not shown, attached to the main machine frame. Cable 42, from the reciprocable electrode mounting to the main machine frame, grounds the lower electrode and the escapement assembly, as well as the mechanical hopper. The upper electrode block 43, secured to the pillar 44 by bolts 45, is separated from the pillar by insulation 46. Bolt holes 47 and bolt heads 48 are insulated as well. Thus, metal to metal contact between the lower electrode and the escapement mechanism is possible, since both are at ground potential, and existing standards requiring the mechanical hopper to be grounded are satisfied.

What is claimed is:

1. In an automatic nut loading and projection welding machine provided with a motorized hopper for containing and continuously feeding sheet metal nuts to be welded, a pair of oppositely disposed and relatively reciprocable electrodes adapted to resistance weld said nuts to a metal sheet positioned therebetween, a track extending generally downwardly from said hopper to said electrodes for automatically conveying the nuts thereto, a pair of vertically spaced guide blocks receiving said track at the lower end thereof, a pair of laterally spaced blocks separating said vertically spaced blocks and defining a passage way between said vertically spaced guide blocks and said laterally spaced blocks to allow the passage of nuts therethrough, a pair of jaws resiliently mounted on said laterally spaced blocks adapted to receive said nuts one at a time therebetween and position said nut over the lower of said electrodes, and a bushing mounted in one of said vertically spaced guide blocks engaging said last recited electrode and positioning said electrode to move said nut from between said jaws to the metal sheet for welding the nut thereon.

2. In an automatic nut loading and projection welding machine provided with a motorized hopper for containing and continuously feeding nuts to be welded to a metal sheet, a machine frame, a stationary electrode depending from said frame, a reciprocable electrode oppositely disposed to said stationary electrode, a pilot portion on the upper end of said reciprocable electrode receivable in the holes in said weld nuts, mounting and reciprocating means for said reciprocable electrode secured to said machine frame, a supporting bracket attached to said mounting and reciprocating means and adjacent said reciprocable electrode, a pair of vertically spaced guide blocks slidably mounted on said supporting bracket and receiving said reciprocable electrode therethrough, a pair of laterally spaced separator blocks separating said vertically spaced guide blocks, a track extending from said hopper and receivable between said vertically spaced guide blocks to feed weld nuts through the passage defined by said vertically spaced guide blocks and said laterally spaced separator blocks, a pair of jaws resiliently mounted on said laterally spaced separator blocks adapted to receive said weld nuts from said passage one at a time and retain said weld nut over and co-axial with said pilot portion of said reciprocable electrode, and cam surfaces on said jaws engageable by said reciprocable electrode to allow said electrode to separate said jaws and carry said weld nut to said metal sheet for welding thereto.

3. An automatic nut loading and projection welding machine as described in claim 2 having power supplied to said stationary upper electrode, insulation means between said upper electrode and said machine frame, and said reciprocable lower electrode being electrically grounded to said machine frame.

4. In an apparatus for automatically feeding and welding fasteners having openings extending therethrough to a metal sheet, a hopper for supplying said fasteners to be welded, a reciprocable lower electrode, a stationary upper electrode on the opposite side of a metal sheet supported between said electrodes, a track leading from said hopper to said electrodes for conveying said fasteners thereto, and an assembly for successively positioning said fasteners between said electrodes, said assembly comprising a supporting bracket, a bushing block slidably mounted on said supporting bracket, a bushing receivable in said bushing block and adapted to receive said reciprocable electrode, an upper guide block vertically spaced from said bushing block to allow passage of fasteners therebetween, a pair of spacer blocks separating said bushing block and said upper guide block and laterally spaced to allow passage of fasteners therebetween, a pair of jaws resiliently mounted on said spacer blocks between said bushing block and said upper guide block for receiving said fasteners one at a time from said track through the passage defined by said spaced blocks and retaining said fastener above and co-axial with said reciprocable electrode, and cam surfaces on said jaws adapted to be engaged by said reciprocable electrode to open said jaws such that the fastener will be carried to said sheet metal by said reciprocable electrode for welding said fastener to said sheet.

5. A machine for feeding and positioning fasteners to be attached to a supporting body, said machine comprising a track for conveying the fasteners to be attached, means for supplying the fasteners to said track, an assembly adjacent the lower end of said track for positioning said fasteners on the supporting body, and an escape mechanism for successively releasing said fasteners to said assembly having a supporting bracket attached to the main frame of the machine, a bushing block slidably mounted on said supporting bracket, an upper guide block vertically spaced from said bushing block to receive the lower end of said track, spacer blocks separating said bushing block and said upper guide block and laterally spaced to provide passage of fasteners therebetween, a pair of jaws resiliently mounted on said spacer blocks adapted to receive fasteners one at a time from the passage between the bushing block and said upper guide block and retain said fasteners in a loading position in said assembly.

6. A nut loading and resistance welding machine provided with a stationary electrode and an oppositely disposed reciprocable electrode adapted to resistance weld nuts to a metallic member positioned therebteween comprising a hopper for containing and feeding said nuts, a track extending from said hopper to said electrodes for conveying the nuts thereto, a nut positioning assembly located adjacent the electrode tips and having a supporting bracket secured to the main machine frame, a pair of vertically spaced guide blocks slidably mounted on said supporting bracket and receiving the lower end of said track, spacer blocks separating said vertically spaced guide blocks and laterally spaced to provide passage of nuts therethrough from said track, a pair of jaws resiliently mounted on said spacer blocks to receive said nuts one at a time therebetween and position said nuts co-axially over said reciprocable electrode, and cam surfaces on said jaws engageable by said reciprocable electrode such that said electrode will separate said jaws and carry said nut to said metallic member upward for welding said nut thereto.

7. A welding nut loading mechanism comprising a supporting bracket, a bushing block slidably mounted on said supporting bracket, a bushing receivable in said bushing block and adapted to receive a reciprocable welding electrode, an upper guide block vertically spaced from said bushing block to allow passage of weld nuts therebetween, spacer blocks laterally spaced between said bushing block and said upper guide block to allow passage of weld nuts therebetween, and a pair of jaws resiliently mounted on said spacer blacks between said bushing block and said upper guide block at the end of the passage defined by said spaced blocks and adapted to retain a weld nut in a position above and co-axial with a reciprocable welding electrode 8. A nut loading and resistance welding machine comprising a machine frame, a reciprocable lower electrode electrically grounded to said machine frame, a stationary upper electrode having power supplied thereto to provide the proper welding potential between said electrodes, insulation means between said upper electrode and said machine frame, an escapement assembly received about said reciprocable lower electrode and in contact therewith to feed weld nuts one at a time to said lower electrode, a hopper mounted on said machine frame, a track extending generally downwardly from said hopper to said escapement assembly for supplying weld nuts thereto, said frame, hopper, track, and escapement assembly being at ground potential with said reciprocable electrode.

References Cited in the file of this patent

UNITED STATES PATENTS

| | | |
|---|---|---|
| 2,078,694 | Smith | Apr. 27, 1937 |
| 2,181,290 | Wilkins | Nov. 28, 1939 |
| 2,685,018 | Mynar | July 27, 1954 |